(12) United States Patent
DiDomizio et al.

(10) Patent No.: US 10,260,370 B2
(45) Date of Patent: Apr. 16, 2019

(54) NANOSTRUCTURED FERRITIC ALLOY COMPONENTS AND RELATED ARTICLES

(71) Applicant: General Electric Company, Schenectady, NY (US)

(72) Inventors: Richard DiDomizio, Charlton, NY (US); Anne O'Dell Knight, Piedmont, SC (US); Laura Cerully Dial, Clifton Park, NY (US); Shenyan Huang, Niskayuna, NY (US); Michael Francis Xavier Gigliotti, Jr., Glenville, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 1166 days.

(21) Appl. No.: 14/565,732

(22) Filed: Dec. 10, 2014

(65) Prior Publication Data

US 2016/0312653 A1    Oct. 27, 2016

(51) Int. Cl.
*F01D 5/02* (2006.01)
*F01D 25/00* (2006.01)
(Continued)

(52) U.S. Cl.
CPC .............. *F01D 25/005* (2013.01); *B22F 7/04* (2013.01); *B23K 9/0282* (2013.01); *B23K 9/167* (2013.01);
(Continued)

(58) Field of Classification Search
CPC ....... F01D 25/005; F01D 5/02; B23K 9/0282; B23K 9/173; B23K 9/167; F04D 29/023; F04D 29/284; B22F 7/04; C21D 9/0068; C21D 7/13; C21D 6/02; C21D 38/00; C21D 38/08; C21D 38/30
See application file for complete search history.

(56) References Cited

U.S. PATENT DOCUMENTS

| 4,679,314 A | 7/1987 | Lenz et al. |
| 4,962,586 A | 10/1990 | Clark et al. |

(Continued)

FOREIGN PATENT DOCUMENTS

WO    WO-2013045334 A1 *   4/2013   ............... B02C 4/28

OTHER PUBLICATIONS

Fu et al., "Microstructural characterization of a diffusion-bonded joint for 9Cr-ODS and JLF-1 reduced activation ferritic/martensitic steels", Fusion Engineering and Design, ScienceDirect, Fusion Engineering and Design 89, Apr. 5, 2014, pp. 1658-1663.

(Continued)

*Primary Examiner* — Laura A Auer
(74) *Attorney, Agent, or Firm* — GE Global Patent Operation; John Darling

(57) ABSTRACT

An article, for example a turbomachinery article is presented. The article includes a weldable first component having a base portion and a flange portion. The flange portion is outwardly projecting normal to a surface of the base portion; and is joined with the base portion by a solid state joint. The base portion comprises a nanostructured ferritic alloy; and the flange portion comprises a steel substantially free of oxide nanofeatures. The first component is joined to a second component through the flange portion of the first component by a weld joint.

11 Claims, 3 Drawing Sheets

(51) Int. Cl.

| | |
|---|---|
| F04D 29/02 | (2006.01) |
| F04D 29/28 | (2006.01) |
| C22C 38/00 | (2006.01) |
| C22C 38/08 | (2006.01) |
| C22C 38/30 | (2006.01) |
| C21D 6/02 | (2006.01) |
| C21D 7/13 | (2006.01) |
| C21D 9/00 | (2006.01) |
| B22F 7/04 | (2006.01) |
| B23K 9/028 | (2006.01) |
| B23K 9/167 | (2006.01) |
| B23K 9/173 | (2006.01) |
| C21D 1/22 | (2006.01) |
| B33Y 10/00 | (2015.01) |
| B33Y 80/00 | (2015.01) |
| B23K 101/00 | (2006.01) |
| B23K 103/02 | (2006.01) |
| C22C 38/02 | (2006.01) |
| C22C 38/04 | (2006.01) |
| C22C 38/06 | (2006.01) |
| C22C 38/44 | (2006.01) |
| C22C 38/48 | (2006.01) |
| C22C 38/50 | (2006.01) |

(52) U.S. Cl.
CPC .............. B23K 9/173 (2013.01); C21D 6/02 (2013.01); C21D 7/13 (2013.01); C21D 9/0068 (2013.01); C22C 38/00 (2013.01); C22C 38/08 (2013.01); C22C 38/30 (2013.01); F01D 5/02 (2013.01); F04D 29/023 (2013.01); F04D 29/284 (2013.01); *B23K 2201/001* (2013.01); *B23K 2203/02* (2013.01); *B33Y 10/00* (2014.12); *B33Y 80/00* (2014.12); *C21D 1/22* (2013.01); *C21D 2201/03* (2013.01); *C21D 2211/004* (2013.01); *C21D 2261/00* (2013.01); *C22C 38/001* (2013.01); *C22C 38/02* (2013.01); *C22C 38/04* (2013.01); *C22C 38/06* (2013.01); *C22C 38/44* (2013.01); *C22C 38/48* (2013.01); *C22C 38/50* (2013.01); *F05D 2220/31* (2013.01); *F05D 2220/32* (2013.01); *F05D 2300/6032* (2013.01)

(56) References Cited

U.S. PATENT DOCUMENTS

| | | | |
|---|---|---|---|
| 5,009,359 | A | 4/1991 | Stoever et al. |
| 5,129,784 | A | 7/1992 | Yoshikawa et al. |
| 5,510,080 | A | 4/1996 | Nishi et al. |
| 6,129,257 | A | 10/2000 | Xu et al. |
| 7,655,879 | B2 | 2/2010 | Witte et al. |
| 7,682,471 | B2 | 3/2010 | Levin |
| 8,597,438 | B2 | 12/2013 | Chandrasekaran et al. |
| 8,616,851 | B2 | 12/2013 | Didomizio et al. |
| 2003/0223866 | A1* | 12/2003 | Giesler .................. F16J 15/348 415/231 |
| 2008/0141616 | A1 | 6/2008 | Ohngren |
| 2010/0132365 | A1* | 6/2010 | Labala .................... F01D 25/18 60/776 |
| 2010/0219711 | A1* | 9/2010 | Gruendl ................. H02K 3/525 310/156.25 |
| 2011/0250074 | A1* | 10/2011 | DiDomizio ............... C22C 1/05 416/223 R |
| 2014/0178188 | A1* | 6/2014 | Li ......................... F01D 5/3061 415/185 |
| 2014/0234021 | A1* | 8/2014 | Frangenberg ............. B02C 4/28 403/335 |

OTHER PUBLICATIONS

Hammelmann et al., "Diffusion welding of ODS alloys using HIP-techniques", Materials Science, IAEA INIS, vol. 22, Issue-09, Sep. 1990, Abstract only, 1 Page.

Khan et al., "Transient liquid phase diffusion bonding and associated recrystallization phenomenon when joining ODS ferritic superalloys", Journal of Materials Science, Springer Link, vol. 31, Issue 11, Jun. 1996, Abstract only, 1 Page.

Kurt et al., "Diffusion bonding between Ti-6Al-4V alloy and ferritic stainless steel", Materials Letters, ScienceDirect, vol. 61, Issues 8-9, Apr. 2007, pp. 1747-1750.

\* cited by examiner

NANOSTRUCTURED FERRITIC ALLOY COMPONENTS AND RELATED ARTICLES

BACKGROUND

The present disclosure relates to nanostructured ferritic alloy (NFA) components, and more particularly, weldable components comprising an NFA and welded articles thereof.

Turbomachines such as heavy-duty gas turbines and jet engines operate in extreme environments, exposing the turbine components, especially those in the turbine hot section, to high operating temperatures. Turbine components are necessarily manufactured from materials capable of withstanding these severe conditions.

Superalloys have been used in these demanding applications because they maintain their strength up to 90% of their melting temperature and have excellent environmental resistance. Nickel-based superalloys used in heavy-duty turbine components require specific processing steps to achieve the desired mechanical properties. In some lower temperature and stress applications, steels may be used for turbine components. However, designs for improved gas turbine performance require alloys with even higher temperature capability. Nanostructured ferritic alloys (NFAs) are an emerging class of iron-based alloys that exhibit exceptional high temperature properties. These properties are typically derived at least in part from nanometer-sized oxide particulates or clusters that precipitate within the alloy matrix during hot consolidation following a mechanical alloying step. These oxide particulates or clusters remain present at high temperatures, providing a strong and stable microstructure during service.

Turbine components, such as rotors and shafts, made of conventional steel or superalloys, are typically joined to one another to form an assembly. Joining is generally performed by either bolting or welding. Removing bolt holes allows for material reduction and elimination of a key concentrated stress area in the rotor. This can lead to design flexibility and simplification. In comparison to other joining processes, conventional welding is a relatively simple and inexpensive process. Moreover, welding can generally be used to form a strong joint, while reducing the required flange height and the mass of the rotor as compared to that of in case of bolting. However, NFA components cannot be welded by conventional methods while preserving their microstructure and mechanical properties, as will be explained in more detail below.

Therefore, it is desirable to have NFA components, for example components for turbomachinery that can be welded to other components without sacrificing the mechanical properties of NFAs at operating temperatures.

BRIEF DESCRIPTION

In some embodiments, an article is presented. The article includes a first component having a base portion and a flange portion. The flange portion is outwardly projecting normal to a surface of the base portion; and is joined with the base portion by a solid state joint. The base portion comprises a nanostructured ferritic alloy; and the flange portion comprises a steel substantially free of oxide nanofeatures. In some embodiments, the article includes a second component that is joined with the flange portion of the first component by a weld joint.

In some embodiments, an article includes a first component that has a circular base portion extending from an inner periphery to an outer periphery. The first component further includes a circular flange portion concentric to the circular base portion, which is outwardly projecting normal to a surface between the inner periphery and the outer periphery of the circular base portion; and is joined with the circular base portion by a solid state joint. The circular base portion comprises a nanostructured ferritic alloy and the circular flange portion comprises a steel substantially free of oxide nanofeatures. In some embodiments, the article includes a turbomachinery component.

DRAWINGS

These and other features, aspects, and advantages of the present invention will become better understood when the following detailed description is read with reference to the accompanying drawing in which like characters represent like parts throughout the drawings, wherein.

DETAILED DESCRIPTION

Figure 1:
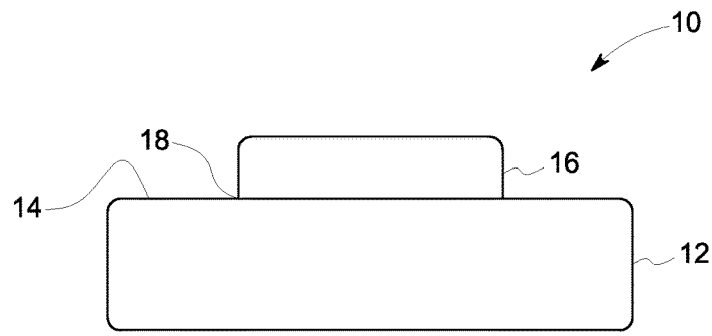
FIG. 1 is a perspective view of a first component, in accordance with one embodiment of the invention.

As discussed in detail below, some embodiments of the invention provide an article that includes a first component comprising a nanostructured ferritic alloy (NFA), which can be conventionally welded. According to embodiments of the invention, the first component includes a base portion and a flange portion. The flange portion is outwardly projecting normal to a surface of the base portion and is joined with the base portion by a solid state joint. The base portion includes a nanostructured ferritic alloy (NFA); and the flange portion includes a steel that is substantially free of oxide nanofeatures. The flange portion of the first component is a weldable portion that enables the joining of the first component to another component by conventional welding without affecting the microstructure of the NFA base portion, and thus preserving the mechanical properties of the NFA. Embodiments of the present invention advantageously provide weldable components that can be economically joined with other component(s), and cost-effective articles or assemblies that include weldable NFA components.

A "flange portion" or a "flange", as used herein, refers to an externally raised ridge, lip, or other projection from a surface, which facilitates the assembly of a component with another component; and may increase the structural stiffness of the component.

A particular application is described, herein, in conjunction with turbomachinery components, such as components of a gas turbine and a steam turbine. It should be appreciated, however, that the present components, articles and methods, as disclosed herein, are also applicable to various other applications and industries, for example oil and gas production and extraction applications.

Unless defined otherwise, technical and scientific terms used herein have the same meaning as is commonly understood by one of skill in the art to which this invention belongs. The terms "comprising," "including," and "having" are intended to be inclusive, and mean that there may be additional elements other than the listed elements. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced item, and the term "free" and "substantially free" may be used in combination with a term, and may include an insubstantial number, or trace amounts, while still being considered free of the modified term.

If ranges are disclosed, the endpoints of all ranges directed to the same component or property are inclusive and independently combinable (e.g., ranges of "up to about 25 weight percent or, more specifically, about 5 weight percent to about 20 weight percent," is inclusive of the endpoints and all intermediate values of the ranges of "about 5 weight percent to about 25 weight percent," etc.). The modifier "about" used in connection with a quantity is inclusive of the stated value and has the meaning dictated by the context (e.g., includes the degree of error associated with measurement of the particular quantity).

FIG. 1 illustrates a perspective view of a first component 10. In the illustrated embodiment, the first component 10 includes a base portion 12 and a flange portion 16. The flange portion 16 is outwardly projecting normal to a surface 14 of the base portion 12; and is joined with the base portion 12 by a solid state joint 18. The base portion 12 includes a nanostructured ferritic alloy (NFA). The flange portion 16 includes a steel that is substantially free of oxide nanofeatures. In one embodiment, the base portion 12 is composed of a nanostructured ferritic alloy; and the flange portion 16 is composed of a steel that is substantially free of oxide nanofeatures.

The nanostructured ferritic alloys (NFAs) are a class of alloys that comprise a steel alloy matrix that is dispersion strengthened by a very high density, for example, at least about $10^{18}$ m$^{-3}$ of nanometer (nm)-scale oxide nanofeatures. The oxide nanofeatures usually comprise titanium oxide (Ti—O) and at least one other metal element from an oxide used to prepare the NFA or the alloy matrix. For example, yttrium oxide, aluminum oxide, zirconium oxide, hafnium oxide may be used to prepare the NFAs, in which case, the nanofeatures may comprise yttrium (Y), aluminum (Al), zirconium (Zr), hafnium (Hf) or combinations of these, in addition to the aforementioned titanium. Other metals, such as iron (Fe), chromium (Cr), molybdenum (Mo), tungsten (W), manganese (Mn), silicon (Si), niobium (Nb), aluminum (Al), nickel (Ni), or tantalum (Ta) from the steel alloy matrix may also participate in the creation of the nanofeatures.

As used herein, the term "nanofeatures" means particles of matter having a largest dimension less than about 20 nanometers in size. The nanofeatures of an NFA may have any shape, including, for example, spherical, cuboidal, lenticular, and other shapes. The oxide nanofeatures used herein are typically formed in-situ in the NFA. The starting oxide dissolves into the steel alloy matrix during processing. During hot consolidation, a new phase comprising nanometer sized oxides precipitate (i.e., oxide nanofeatures), providing the enhanced mechanical properties. In some embodiments, an average size of nanofeatures ranges from about 1 nanometer to about 20 nanometers. In certain instances, the average size of nanofeatures ranges from about 1 nanometer to about 10 nanometers. The density of nanofeatures, in some instances, is at least about $10^{20}$ m$^{-3}$, and in some certain instances, at least about $10^{22}$ m$^{-3}$.

In contrast, conventional oxide dispersion strengthened (ODS) alloys generally contain refined, but larger, oxide phases, and the oxide additive is stable throughout the powder metallurgy process, i.e., if yttrium oxide were added to the matrix alloy, ytrrium oxide would be present after the alloying step and there would be no significant formation of the nanofeatures (NFs) described above. In an NFA, at least the majority, and in some cases, substantially all of the added oxide is dissolved into the alloy matrix during powder attrition and participates in the formation of the aforementioned nanofeatures when the powder is raised to a temperature during the compaction process, for example hot isostatic pressing (HIP). As described above, the new oxide in the NFA may comprise one or more transition metals present in the base alloy as well as the metallic element(s) of the initial oxide addition.

In one embodiment, the nanostructured ferritic alloy (NFA) includes a steel matrix phase having a composition equivalent to a ferritic stainless steel. In certain other embodiments, martensitic, duplex, austenitic stainless steel or precipitation hardened steel are also potential matrix compositions. The nature of the steel matrix phase may affect, to some degree, the environmental resistance and the material ductility of the resultant NFA.

In one embodiment, the NFA includes chromium. Chromium can be important for ensuring oxidation resistance, and may thus be included in the NFA in amounts of at least about 5 weight percent, and in some embodiments, at least about 9 weight percent. Amounts of up to about 30 weight percent, and in some instances up to about 20 weight percent can be included. Advantageously, both chromium and iron, the basis of the NFA, are readily available and relatively low in cost, in particular as compared to the nickel-based superalloys which the NFAs may replace in some applications.

In some embodiments, the NFA includes molybdenum. An amount of up to about 10 weight percent can be included. In some instances, the amount of molybdenum ranges from about 3 weight percent to about 10 weight percent. In some other instances, the amount of molybdenum ranges from about 1 weight percent to about 5 weight percent.

The NFA may further include titanium. Titanium may participate in the formation of the precipitated oxide, and so, amounts of titanium of from about 0.1 weight percent to about 2 weight percent, and in some instances, from about 0.1 weight percent to about 1.0 weight percent, and in certain instances, from about 0.1 weight percent to about 0.8 weight percent, are desirably included in the NFA.

The composition of the nanofeature(s) may depend, in part, upon the oxide utilized to prepare the NFA. Generally, an NFA as described herein includes at least about 0.1% oxygen by weight. The amount of oxygen present in the alloy determines in part the resultant type and concentration of nanofeatures present in the alloy. In some embodiments, the oxygen content is in a range from about 0.1% to about 0.5%, and in particular embodiments, the range is from about 0.1% to about 0.3%, where all percentages are by total weight of the alloy.

One illustrative NFA suitable for use in the formation of the base portion 12 of the first component 10 comprises from about 5 weight percent to about 30 weight percent chromium, from about 0.1 weight percent to about 2 weight percent titanium, from about 0 weight percent to about 10 weight percent molybdenum, from about 0 weight percent to about 5 weight percent tungsten, from about 0 weight percent to about 5 weight percent manganese, from about 0 weight percent to about 3 weight percent silicon, from about 0 weight percent to about 2 weight percent niobium, from about 0 weight percent to about 2 weight percent aluminum, from about 0 weight percent to about 8 weight percent nickel, from about 0 weight percent to about 2 weight percent tantalum, from about 0 weight percent to about 0.5 weight percent carbon, and from about 0 weight percent to about 0.5 weight percent nitrogen, with the balance being iron and incidental impurities; and a number density of at least about $10^{18}$ m$^{-3}$ nanofeatures comprising titanium, oxygen, and at least one element derived from the oxide added during the preparation of the NFA or from the alloy matrix.

In other embodiments, the NFA comprises from about 9 weight percent to about 20 weight percent chromium, from about 0.1 weight percent to about 1 weight percent titanium, from about 0 weight percent to about 10 weight percent molybdenum, from about 0 weight percent to about 4 weight percent tungsten, from about 0 weight percent to about 2.5 weight percent manganese, from about 0 weight percent to about 1 weight percent silicon, from about 0 weight percent to about 1 weight percent niobium, from about 0 weight percent to about 1 weight percent aluminum, from about 0 weight percent to about 4 weight percent nickel, from about 0 weight percent to about 1 weight percent tantalum, from about 0 weight percent to about 0.1 weight percent carbon, and from about 0 weight percent to about 0.2 weight percent nitrogen, with the balance being iron and incidental impurities; and a number density of at least about $10^{20}$ m$^{-3}$ nanofeatures comprising titanium, oxygen and at least one element derived from the oxide added during the preparation of the NFA or from the alloy matrix.

In yet other embodiments, the NFA comprises from about 9 weight percent to about 14 weight percent chromium, from about 0.1 weight percent to about 0.8 weight percent titanium, from about 0 weight percent to about 10 weight percent molybdenum, from about 0 weight percent to about 3 weight percent tungsten, from about 0 weight percent to about 1 weight percent manganese, from about 0 weight percent to about 0.5 weight percent silicon, from about 0 weight percent to about 0.5 weight percent niobium, from about 0 weight percent to about 0.5 weight percent aluminum, from about 0 weight percent to about 2 weight percent nickel, from about 0 weight percent to about 0.5 weight percent tantalum, from about 0 weight percent to about 0.05 weight percent carbon, and from about 0 weight percent to about 0.1 weight percent nitrogen, with the balance being iron and incidental impurities; wherein the NFA comprises a number density of at least about $10^{22}$ m$^{-3}$ nanofeatures comprising titanium, oxygen and at least one element derived from the oxide added during preparation of the NFA or from the alloy matrix.

Moreover, it may be desirable to have a corrosion resistant component and/or article depending on the operating environment, for example in a sour and acid environment such as those associated with oil and gas production and extraction applications. As corrosion is typically a surface-driven phenomenon, the characteristics of an outer surface are often very important in determining the corrosion resistance of the base portion 12. The corrosion resistance of the nanostructured ferritic alloy in many environments is generally proportional to the concentrations of molybdenum and chromium dissolved within the matrix of the alloy. However, as concentrations of these elements are increased in the alloys, the thermodynamics of the alloy chemistry increasingly favor the formation of intermetallic phases, such as chi phase and sigma phase that are rich in molybdenum and/or chromium. As these phases form, they remove molybdenum and chromium from the matrix, sequestering these desirable elements into the intermetallic compounds and leaving behind a depleted matrix that is substantially less corrosion resistant than it would be if the elements remained in solution.

Thus, the base portion 12 of the first component 10 may be engineered to provide an outer surface that includes corrosion resistant nanostructured ferritic alloy (NFA) as described in U.S. application Ser. No. 14/334,742 filed on 18 Jul. 2014. In some embodiments, at the outer surface, for example at surface 14, the alloy matrix includes about 5 weight percent to about 30 weight percent of chromium, and about 0.1 weight percent to about 10 weight percent of molybdenum. Further, a concentration of a chi phase or a sigma phase at the outer surface is less than about 5 volume percent. Moreover, in yet some embodiments, the outer surface of the base portion 12 maintains high levels of molybdenum and chromium dissolved within the matrix, often levels in excess of the solubility limits that would be expected for thermodynamic equilibrium.

As noted, the flange portion 16 includes a steel that is substantially free of oxide nanofeatures. In some embodiments, the flange portion 16 includes a steel or a steel alloy that is different from the nanostructured ferritic alloy (NFA), which may also be referred to as "non-NFA steel." In one embodiment, the flange portion 16 is formed of a non-NFA steel, for example a conventional steel. Some examples include martensitic steel, ferritic steel, austenitic steel, duplex steel and precipitation hardened steel.

Moreover, the matrix composition of the NFA of the base portion 12 and the non-NFA steel of the flange portion 16 may include the same or different steel alloy compositions. In some embodiments, the matrix of the NFA for the base portion 12 includes a ferritic steel composition and the non-NFA steel of the flange portion 16 includes the same ferritic steel composition. The use of the same steel composition for the formation of the flange portion 16 as used in the NFA of the base portion 12 may limit the amount of material interdiffusion that occurs at a joint during the service of the component, thus extending service life.

The flange portion 16 is joined with the base portion 12 by a solid state joint 18. As used herein, a solid state joint 18 is a metallurgical joint that does not produce or otherwise involve a molten material during the formation of the joint. During solid state joining, the bonding and processing take place in the solid state by avoiding melting and solidification. Examples of suitable joining techniques include, but are not limited to, diffusion bonding, forge enhanced bonding, inertia welding, translation friction welding, activated diffusion bonding, and hot isostatic pressing (HIP).

Figure 2:
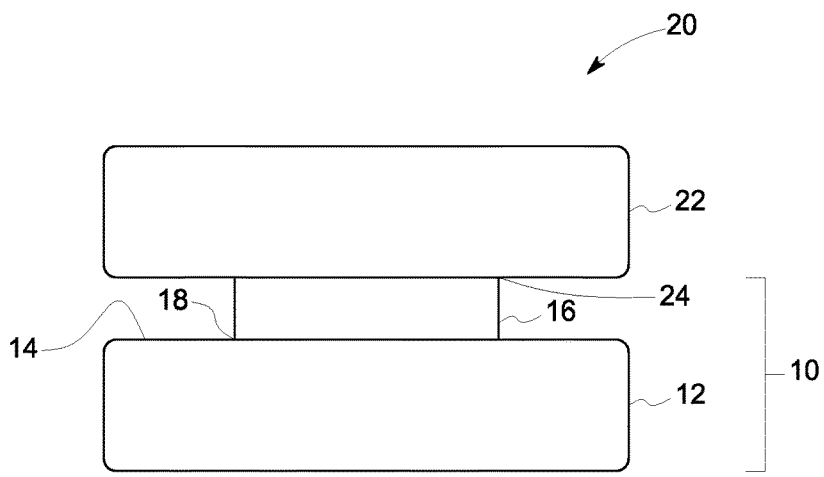
FIG. 2 is a perspective view of an article, in accordance with one embodiment of the invention.

In some embodiments, the article further includes a second component that is joined with the flange portion 16 of the first component 10 by a weld joint. FIG. 2 illustrates a perspective view of an article 20. The article 20 includes the first component 10 as described in FIG. 1 and a second component 22 that is joined with the flange portion 16 of the first component 10 by a weld joint 24. The second component 22 may include any metallic material that can be welded, for example a conventional steel or a superalloy. In one embodiment, the second component 22 includes a conventional steel selected from ferritic steel, martensitic steel, austenitic steel, duplex steel or precipitation hardened steel. In another embodiment, the second component 22 includes a nickel-based superalloy.

Figure 3:
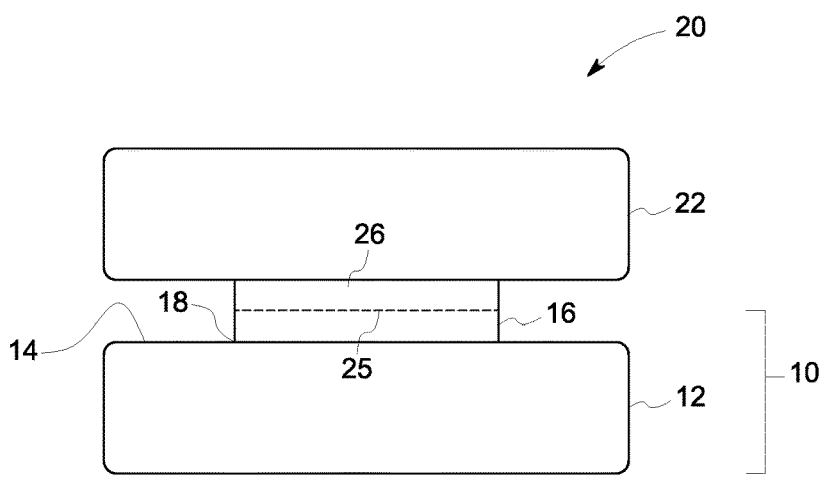
FIG. 3 is a perspective view of an article, in accordance with another embodiment of the invention.

In some embodiments, the second component 22 has a flange 26 that is welded with the flange portion 16 of the first component 10, as illustrated in FIG. 3. The flange portions 16 and 26 of each of the first component 10 and the second component 22 are joined by conventional welding to form a weld joint 25. It may not be required to have a flange on the second component 22 to weld with the flange portion 16, however a flange provides access for welding and assembling the two components. Welding through the flange may also avoid a damage of the second component 22 during the process. In certain embodiments, the second component 22 includes a nanostructured ferritic alloy (NFA). In these embodiments, the flange portion 26 of the second component 22 includes a non-NFA steel, referring to FIG. 3. In one embodiment, the second component 22 is similar to the first component 10 in shape and geometry. In some exemplary embodiments, FIG. 3 is a schematic representation of an assembly of two turbomachinery components. In some instances, a turbomachinery assembly comprises two or more welded components, each comprising an NFA base portion and a flange portion that is substantially free of oxide nanofeatures.

As noted, the second component 22 is joined with the flange portion 16 by a weld joint (24, 25) as shown in FIGS. 2 and 3. The weld joint (24, 25) can be formed by using any welding technique, for example fusion welding and solid state welding techniques. Examples include, but are not limited to, arc welding, laser welding, e-beam welding, tungsten inert gas (TIG) welding, metal inert gas (MIG) welding, and hybrid welding. A conventional welding technique is generally beneficial in reducing the cost of manufacturing of the article. In one embodiment, conventional fusion welding techniques, for example TIG welding and MIG welding are desirable for joining the second component 22 to the flange portion 16 of the first component 10.

As noted previously, a component composed of NFA cannot be directly welded by conventional techniques while preserving the microstructure and property advantages of the NFA. Typically, during a welding process, a region of a NFA component that is in proximity to a portion of the component that is being welded, i.e., in proximity to the weld joint, is affected by the welding process parameters, such as welding temperature, material, etc. This region may be referred to as a "heat affected zone." Because of the affected zone, the NFA component is often damaged during the welding process. Embodiments of the present invention advantageously allow the welding of the first component 10 without affecting the microstructure and properties of the base portion 12 that includes a nanostructured ferritic alloy (NFA). The welding is performed at the flange portion 16 that is free of NFA (or a non-NFA portion). By welding through this non-NFA portion, the weld 24 that joins the first component 10 to the second component 22 takes place away from the NFA base portion 12. Furthermore, it is desirable that substantially the entire base portion 12 is outside the heat affected zone. A person skilled in the art would understand that a size, in particular a height or width and thickness, of the flange portion 16 (FIG. 2) is such that the process of forming the weld 24 does not damage the NFA base portion 12. The height or width of the flange portion 16 is measured in a direction normal to the surface 14 of the base portion 12.

The first component 10 (referring to FIG. 1) as described in the above embodiments may be manufactured using several techniques. In some instances, individual portions, that is, the base portion 12 and the flange portion 16, are separately formed and then joined together to form the first component 10. In some other instances, the first component 10 is manufactured by simultaneous consolidation and joining of the flange portion 16 to the base portion 12. In some instances, the flange portion 16 is additively manufactured on the base portion 12. The first component 10 formed by methods as described herein may be joined with the second component 22 (FIG. 2) by conventional welding, as noted previously.

The nanostructured ferritic alloy (NFA) is a powder metallurgy alloy that is typically first consolidated to fabricate a workpiece, and then hot-worked to manufacture a desired article. The NFA powder can be consolidated by any technique as known in the art. In one embodiment, the workpiece is fabricated by hot isostatic pressing (HIP). Other compaction techniques include hot compaction, extrusion, or roll compaction.

In one embodiment, the workpieces/forgings for the base portion 12 and the flange portion 16 are manufactured beforehand and then mutually joined. For example, a NFA forging for the base portion 12 and conventional steel forging for the flange portion 16 can be joined via any solid state joining technique known in the art to form a solid state joint 18 between the two portions. Examples of the joining techniques include forge enhanced bonding, inertia welding, translation friction welding, diffusion bonding, activated diffusion bonding, and hot isostatic pressing (HIP). After joining the two forgings, the resulting structure can be further forged or machined to a final desired shape to form the first component 10 having the flange portion 16 joined with the base portion 12 as discussed in above embodiments. A specific example is a turbine wheel.

Figure 4:
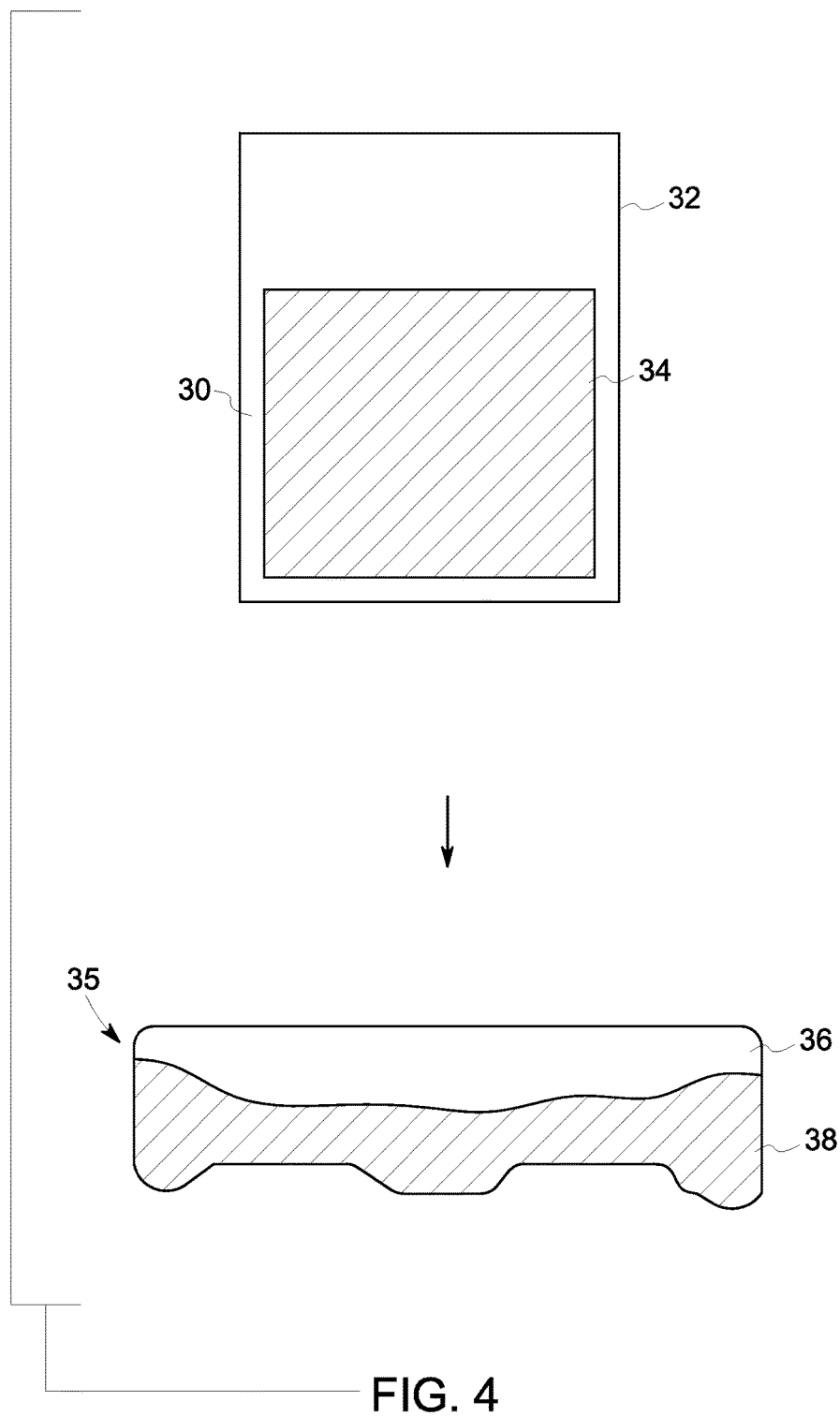
FIG. 4 shows process steps for manufacturing a first component, in accordance with one embodiment of the invention.

In some embodiments, the first component 10 is manufactured by simultaneously consolidating and joining the base portion 12 and the flange portion 16. In one embodiment, the method includes performing consolidation by using hot isostatic pressing. In an illustrative embodiment, a HIP can is first filled with a NFA powder and then a disk or a ring of a non-NFA steel is placed in the can along with the NFA powder. After performing the HIP, the resulting structure is further forged and/or machined to achieve the desired first component 10. In another illustrative embodiment, a HIP can 30 that itself is made of a non-NFA steel is used for the consolidation process, as shown in FIG. 4. The can 30 has at least one thick solid end 32. The can 30 is loaded with a NFA powder 34. The consolidation process, for example HIP, bonds the HIP can 30 to the consolidated NFA resulting in a forging 35 that includes a first portion 36 formed of the non-NFA steel (i.e. a steel forging) and a second portion 38 that includes the NFA forging. This forging 35 can then be shaped by further forging and/or machining resulting in the desired first component 10 that includes the flange portion 16 of the non-NFA steel bonded to the NFA base portion 12.

In some embodiments, the flange portion 16 is additively manufactured on the base portion 12. Additive manufacturing is a known technology that enables the "3D-printing" of components of various materials including metals and plastics. In additive manufacturing, a part is usually built in a layer-by-layer manner from 3D model data, rather than through more traditional subtractive machining processes. A variety of additive manufacturing processes are well-known to those skilled in the art, some of which may involve the melting of a powder or wire. In an illustrative embodiment, the flange portion 16 is formed by wire-feed additive manufacturing. In this embodiment, a forging that includes a first portion formed of the NFA and a second portion that includes a layer of non-NFA steel (i.e. a steel forging) is first formed. This forging may be formed by the process described previously with respect to FIG. 4. The non-NFA steel layer on the NFA forging surface allows for wire-feed laser additive manufacturing of a flange directly onto the non-NFA steel layer by locally melting the non-NFA steel layer and not penetrating into the NFA base portion. In some other embodiments, the non-NFA steel in the form of powder can be applied through a cold-spray technique, a laser engineered net shaping (LENS) technique, or an alternate powder feed or wire feed laser additive manufacturing technique. In these embodiments, a non-NFA layer on the NFA forging may not be required.

One illustrative class of articles that may find particular benefit from application of the concepts described herein includes turbomachinery components. Referring to FIGS. 1-3 again, the first component 10, the second component 22, or both first component 10 and second component 22, are components of a gas turbine or a steam turbine, in some embodiments. Some exemplary components are turbine wheels, turbine shafts, turbine spacers, disks and centrifugal compressor blisks. In one embodiment, the first component 10 is a heavy-duty gas turbine wheel. In one embodiment, the first component 10 is a heavy-duty gas turbine spacer. The first component 10 may also be applicable for any other application involving operation at turbine operating temperatures or corrosive environments. In some embodiments, the first component 10 is a turbomachinery component used in aerospace applications, for example, a jet engine disk. In these embodiments, the second component 22 is a turbomachinery component used in aerospace applications.

In one embodiment, the first component 10 is a turbine wheel and the second component 22 is a turbine shaft. In one embodiment, the first component 10 is a turbine wheel and the second component 22 is another turbine wheel.

Figure 5:
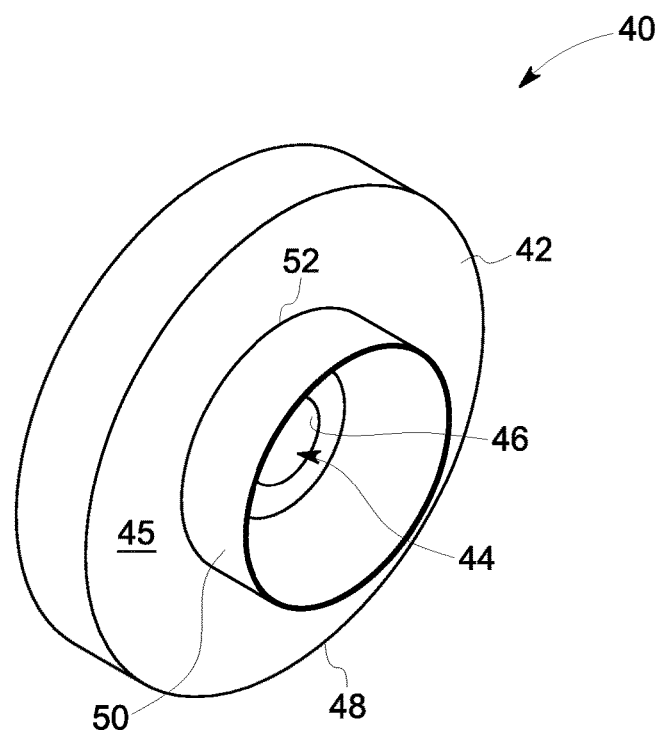
FIG. 5 shows a schematic of a turbine wheel, in accordance with one embodiment of the invention.

In some embodiments, the first component 10 (FIG. 1), for example a turbomachinery component, is circular in shape. FIG. 5 illustrates a schematic of a first component 40, for example a turbine wheel, having a circular base portion 42. For example, the circular base portion 42 may be a disk or a wheel. The circular base portion 42 has a bore 44 defined by an inner periphery 46 of the base portion 42. The base portion 42 extends from the inner periphery 46 to an outer periphery 48, which forms a surface 45. The first component 40 includes a flange portion 50 that is circular in shape such as a ring, and is concentric to the circular base portion 42. The circular flange portion 50 is outwardly projecting normal to a surface 45 of the circular base portion 42. That is the circular flange portion 50 is axially projecting from the surface 45 of the circular base portion 42. The flange portion 50 is joined with the base portion 42 by a solid state joint 52. The circular base portion 42 includes a nanostructured ferritic alloy (NFA), and the circular flange portion 50 includes a non-NFA steel. The circular flange portion 50 is a weldable portion that can be welded with other weldable turbomachinery components. Various details for the base portion 42, the flange portion 50, and the solid state joint 52 are described in the above embodiments.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An article comprising:
a first component having a circular base portion extending from an inner periphery to an outer periphery, and a circular flange portion concentric to the circular base portion and is outwardly projecting normal to a surface between the inner periphery and the outer periphery of the circular base portion, wherein the circular base portion comprises a nanostructured ferritic alloy and the circular flange portion comprises a steel substantially free of oxide nanofeatures, and wherein the circular flange portion is joined with the circular base portion by a solid state joint; and
a second component that is joined with the flange portion of the first component by a weld joint.

2. The article of claim 1, wherein the nanostructured ferritic alloy comprises a metal matrix and oxide nanofeatures dispersed within the metal matrix.

3. The article of claim 2, wherein the metal matrix comprises iron, chromium, cobalt, tungsten, molybdenum, titanium, or a combination thereof.

4. The article of claim 2, wherein the metal matrix comprises a steel selected from ferritic steel, martensitic steel, austenitic steel, duplex steel and precipitation hardened steel.

5. The article of claim 2, wherein the oxide nanofeatures comprises yttrium, zirconium, silicon, titanium, hafnium, or a combination thereof.

6. The article of claim 2, wherein the oxide nanofeatures comprises particles of a median size less than about 20 nanometers.

7. The article of claim 1, wherein the flange portion comprises ferritic steel, martensitic steel, austenitic steel, duplex steel or precipitation hardened steel.

8. The article of claim 1, wherein the first component comprises a turhomachinery component selected one or more of a shaft, a wheel, a spacer and an engine disk.

9. The article of claim 1, wherein the second component comprises a metallic material.

10. The article of claim 9, wherein the metallic material comprises a steel, a nickel based super alloy, or a nanostructured ferritic alloy.

11. The article of claim 1, wherein the second component comprises a turbomachinery component selected one or more from a shaft, a wheel, a spacer and an engine disk.

* * * * *